Figure 1:
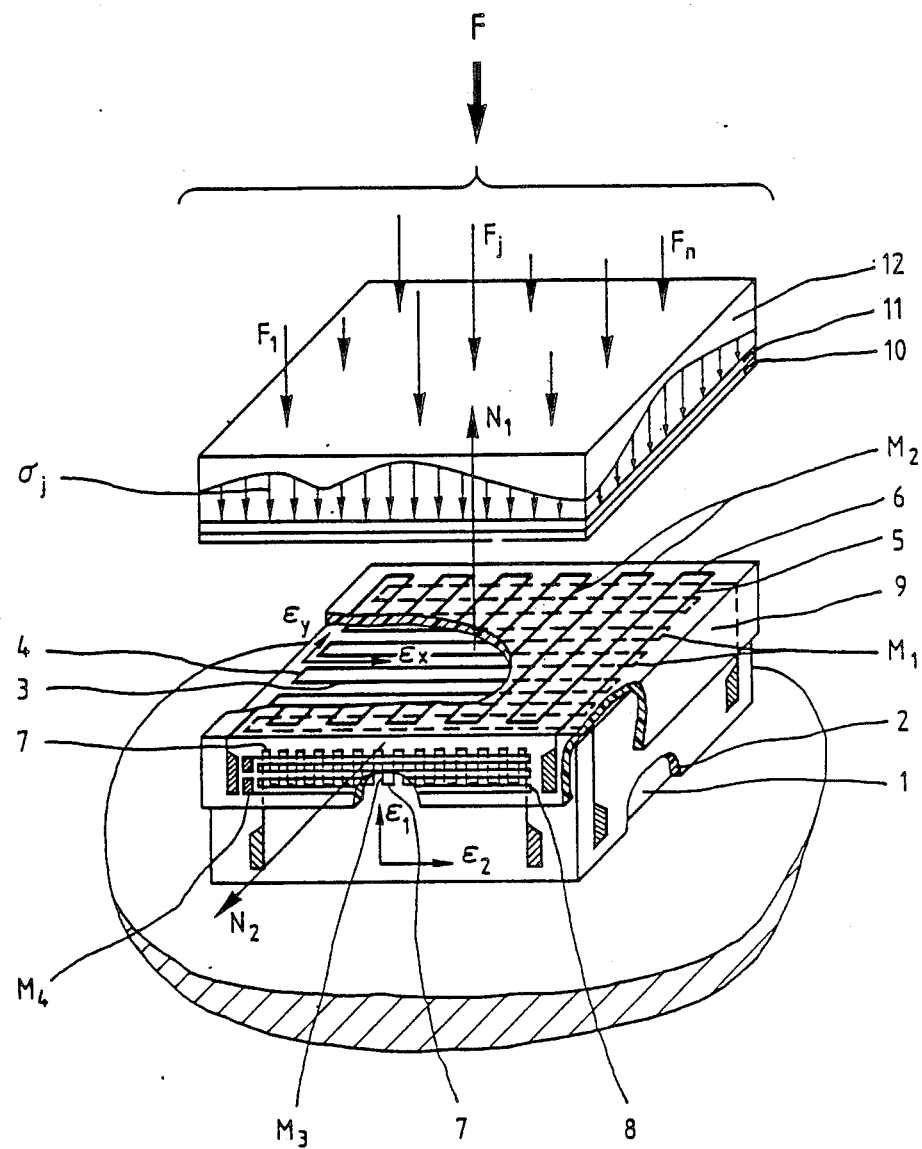

United States Patent [19]

Oppermann

[11] Patent Number: 4,703,663
[45] Date of Patent: Nov. 3, 1987

[54] FORCE SENSOR FOR ELECTRICAL MEASURING OF FORCES, TORQUES, ACCELERATION PRESSURES AND MECHANICAL STRESSES

[76] Inventor: Klaus Oppermann, Eichenallee 31, D-1000 Berlin, Fed. Rep. of Germany

[21] Appl. No.: 859,984

[22] PCT Filed: Aug. 7, 1985

[86] PCT No.: PCT/DE85/00266
§ 371 Date: Mar. 24, 1986
§ 102(e) Date: Mar. 24, 1986

[87] PCT Pub. No.: WO 86/01291
PCT Pub. Date: Feb. 27, 1986

[30] Foreign Application Priority Data
Aug. 9, 1984 [DE] Fed. Rep. of Germany ....... 3429697

[51] Int. Cl.⁴ .......................... G01L 1/18; H01C 10/10
[52] U.S. Cl. ............................... 73/862.68; 73/862.63; 338/47; 338/99
[58] Field of Search ................. 73/766, 767, 768, 774, 73/777, 781, 862.63, 862.68; 338/5, 47, 99, 114

[56] References Cited

U.S. PATENT DOCUMENTS
2,090,188 8/1937 Dahlstrom ....................... 73/862.68
3,314,034 4/1967 Caris .

FOREIGN PATENT DOCUMENTS
1932899 1/1971 Fed. Rep. of Germany .
2260093 8/1975 France .

Primary Examiner—Charles A. Ruehl
Attorney, Agent, or Firm—Armstrong, Nikaido, Marmelstein & Kubovcik

[57] ABSTRACT

Force sensor for electric measuring of forces, mechanical stress or the like, which are converted in the interior of the force sensor into a mechanical normal stress field and then into an electric resistance change. Transverse to the normal stress $\sigma_j$ a piezo-resistive measuring element (17) consisting of at least one layer of resistance material is applied whose material constant c is selected such that a mechanical strain of the measuring element resulting from the strain of a carrier body (1) does not influence the measurement. The resistance layers may be overlying crossing patterns $M_1$, $M_2$ forming area elements (13) of equal area size which completely exhibits the mutually perpendicular strains $\epsilon_x$, $\epsilon_y$ of the carrier body (1). For compensating disturbing influences exterior of the normal stress field a compensation element (18) is provided corresponding to the measuring element (17).

22 Claims, 9 Drawing Figures

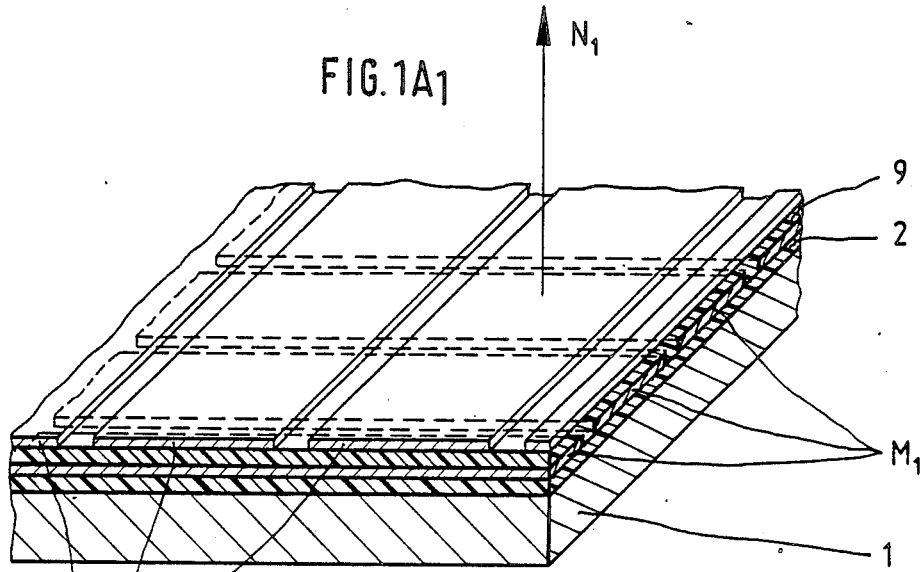
FIG. 1A₁
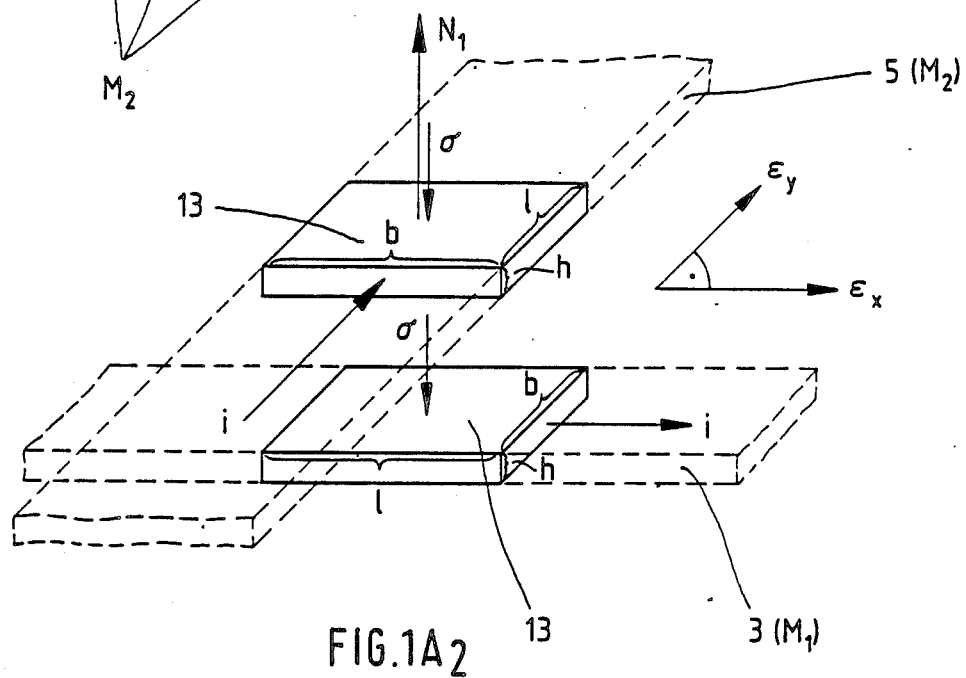
FIG. 1A₂

FORCE SENSOR FOR ELECTRICAL MEASURING OF FORCES, TORQUES, ACCELERATION PRESSURES AND MECHANICAL STRESSES

This invention relates to a force sensor for the electric measurement of forces, torques, accelerations, pressures and mechanical stresses which are converted within the force sensor into a mechanical normal stress field and in turn into an electrical resistance change using a flat piezo-resistive measuring element the resistive material thereof being provided on an electrically insulated carrier body in the shape of at least one filament having joints at the filament ends and being connected in material contact with said body; the measuring element being arranged transverse to the normal stress field which is transmitted to the measuring element from at least one transmission body (DE-A No. 1932899).

Such force sensors, which advantageously eliminate the elastic element necessary for the types of force sensors using strain gauges may be used with advantage in particular for measuring purposes where only a very small insertion height is available, for instance, when screw forces are to be measured. In this case, the force sensor should have the form and size of a washer. Similar requirements exist when measuring bearing forces, machining forces, forming forces, joining forces and impact forces. Force sensors in material testing equipment should be of minimal height in order to reduce the length of the equipment frame and therefore to increase the total stiffness of the testing equipment. Very low force sensor height is further required for measuring the stress in concrete, for measuring pressure in systems with extreme pressures and when measuring high pressure shock waves in the soil and when measuring explosion and detonation pressures in various media. Furthermore, low force sensor height is of great advantage for all dynamic measuring purposes, since thereby the stiffness and the resonance frequency of the force sensor are increased.

For a long time now measuring methods for determining high static pressures using piezo-resistive measuring elements consisting, for instance, of manganin wire located in liquids or solids have been known (VDI-Berichte Nr. 93, VDI-Verlag 1966, pages 21 to 24 and Journal "The Review of Scientific Instruments", volume 35 (1964), pages 989 to 992). The change in the electric resistance of the measuring element is, in this case, a measure for the pressure. For measuring high pressure shock waves measuring elements with resistance filaments of manganin are used which are located within or between solid bodies. The direction of the mechanical stresses to be measured is, in this case, normal to the plane of the measuring element (Journal "ISA Transactions", volume 7 (1968), pages 223 to 230). In order to investigate tribological slide and roll contact zones in components used in building machines, for instance, gears, roller and sliding bearings and camtappet pairs, measuring elements are directly applied to these components by means of modern coating processes such as electric beam vapor deposition. Such measuring elements are used for measuring the pressure response in a lubricating gap and for measuring the Hertzian stress distribution at direct contact (Journal "Konstruktion", volume 32 (1980), No. 6, pages 241 to 246).

When measuring high static pressures from 30 kbar upwards a solid with a low shear module, such as, pyrophyllite or silver chloride is used as pressure transmission medium. Nevertheless, there are often large measuring errors since the solid does not act like a frictionless liquid and, therefore, in the measuring element a quasi-hydrostatic stress is caused which may be differ from one measurement application to the other.

Regarding sensors for measuring forces and mechanical stresses according to DE-A No. 1932899 it is of great disadvantage with those of low height that the lateral strains occuring in the measuring element transverse to the direction of the normal stress field cause large measuring errors. The magnitude of these lateral strains depends on the lateral strain field of the input surfaces of the sensor. This strain field influences the piezo-resistive measuring element due to the low height of the sensor. The elements or media contigent to the input surfaces usually have differing shapes and materials and transmit their lateral strain behavior by means of friction onto the input surfaces of the sensor. This lateral strain response can only in exceptional cases be taken into account when calibrating the sensor. Thus, the lateral strains cause changes in resistance in the measuring element which differ from one measuring procedure to the other. In addition, lateral strain obstructions caused by frictional forces at the input surfaces result in the so-called hysteresial error. Thus, for instance, the lateral strains in the measuring element may differ for the same force depending whether the force approaches from above or below. If organic binders are used for bonding the measuring element to the transmission body time-dependent lateral strains occur in the measuring element at constant load due to the creep response of these binders. This leads to deterioration in the longterm stability and therefore, an increase in the so-called creep error in sensors used for static and quasistatic measuring purposes. Creep phenomena in the materials of the carrier body and the transmission body also contibute to this creep effect, as do time-dependent lateral strain changes at the input surfaces of the sensor.

When measuring Hertzian stress distribution where the element to be tested is used as a carrier body for the measuring element, for instance, the tooth profile of a gear wheel, measuring errors may occur because of the fact that with the actual measurement the lateral strains of the tooth profile are different from those recorded during the calibration performed prior to the measurement due to the mixed frictional states in the contact zone. The calibration is usually performed by application of pressure to the tooth profile by a frictionless liquid.

It is the object of this invention to improve the accuracy and the longterm stability of such force sensors-in particular those of low height-by eliminating disturbing influences such that they may be used both for dynamic and quasistatic measuring processes and for those measuring processes where very high accuracy is required, for instance, in weighing techniques and for precise force measuring.

This object is achieved by force sensor of the type defined by the characterizing features of claim 1.

A filament element consisting of an isotropic material has the electric resistance $$R = \rho \cdot \frac{l}{b \cdot h} \ (s \cdot \text{FIG.} 1a).$$

where $\rho$ is the specific electric resistance, l the length, b the width and h the height of the element. For piezo-resistive measuring elements resistive materials are used which exhibit a linear relation between the mechanical stress $$\frac{dR}{R} = \frac{d\rho}{\rho} + \frac{dl}{l} - \frac{db}{b} - \frac{dh}{h}$$

The relative change of the specific electric resistance is $$\frac{d\rho}{\rho} = \pi_l \frac{d\rho}{\rho} + \pi_q \cdot \left( \frac{db}{b} + \frac{dh}{h} \right)$$

W$\pi_e$ and $\pi_q$ are piezo-resistive coefficients. For the mater constant c the expression is $$c = \frac{\pi_l + 2\pi_q}{3}$$

Assuming that the resistive materials used for the piezo-resistive measuring element have equal piezo-resistive coefficients the $$c = \pi_e = \pi_q$$

In the VDI-Berichten Nr. 509, VDI-Verlag 1984, pages 79 to 83 the relative resistance change of a conductor filament element due to normal stress $\sigma$ acting transversal to the direction of the current was derived, assuming the above, as $$\frac{dR}{R} = \frac{\sigma}{E} \cdot (c - 1) \cdot u +$$

$$\left( \frac{d\rho}{\rho} + \frac{db}{b} \right) \cdot (c \cdot v + w) + \left( \frac{d\rho}{\rho} - \frac{db}{b} \right)$$

Where u, v and w are the terms $$u = 1 - \frac{2\mu^2}{1-\mu}, \quad v = \frac{1-2\mu}{1-\mu} \text{ und } w = \frac{\mu}{1-\mu};$$

E is the Young's modulus and $\mu$ is the Poisson's ratio of the filament material.

Since the conductor filaments of the piezo-resistive measuring element are firmly attached to the carrier body in a thin film arrangement they are subjected to all the strains thereof. By means of the patterns illustrated in FIG. 1a having filaments crossing each other at right angles the way in which this problem is solved will be shown. When condidering one filament in pattern $M_1$ (filament 3) through which a current i flows in the direction of $\epsilon_x$ and which has the resistance $R_1$ there is in view of $(d\rho/\rho) = \epsilon_x$ and $(db/b) = \epsilon_y$ $$\frac{dR_1}{R_1} = \frac{\sigma}{E} \cdot (c - 1) \cdot u + (\epsilon_x + \epsilon_y) \cdot (c \cdot v + w) + (\epsilon_x - \epsilon_y)$$

For the overlying filament element in pattern $M_2$ (filament 5) through which the current i flows in the direction of $\epsilon_y$ and which has the resistance $R_2$ there is in view of the $(d\rho/\rho) = \epsilon_y$ and $(db/b) = \epsilon_x$, $$\frac{dR_2}{R_2} = \frac{\sigma}{E} \cdot (c - 1) \cdot u + (\epsilon_y + \epsilon_x) \cdot (c \cdot v + w) + (\epsilon_y - \epsilon_x)$$

Choosing $R_1 = R_2 = R$ and connecting, for instance, the two filament elements or two patterns, respectively, in series the change in resistance of the two filament elements is $$\frac{dR_1 + dR_2}{2R} = \frac{\sigma}{E} \cdot (c - 1) \cdot u + (\epsilon_x + \epsilon_y) \cdot (c \cdot v + w)$$

The cross pattern and the series connection of the filament elements thus result in an elimination of the terms which contain the difference of the orthogonal strains $\epsilon_x$ and $\epsilon_y$.

If it is desired, that the change in resistance is completely independent from the local strains $\epsilon_x$, $\epsilon_y$ of the carrier body the second term in the above last equation which contains the sum of the strains must be zero, too. Thus, it must be $$c \cdot v + w = 0$$

This is the case when the material constant c assumes the value $$c = -\frac{w}{v} = -\frac{\mu}{1 - 2\mu} \quad \text{(condition equation)}$$

The change in the electric resistance of a conductor under hydrostatic pressure p is given in terms of the so-called pressure coefficient $\alpha_p$ of the electric resistance $$\frac{dR}{R} = \alpha_p \cdot p$$

Considering this equation and with regard to $\sigma = -p$ and $$\frac{dl}{l} = \frac{db}{b} = -\frac{p}{E} \cdot (1 - 2\mu)$$

and with the equation for the relative change in resistance of a conducter filament $\alpha_p$ is $$\alpha_p = (1 - 3c) \cdot \frac{1 - 2\mu}{E}$$

Using the condition equation for the material constant c then is $$\alpha_p = \frac{1 + \mu}{E}$$

In order that the strains of the carrier body may not cause any disturbing changes in resistance in the piezo-resistive measuring element resistive materials must be used whose pressure coefficient of the electric resistance is equal to the value $(1+\mu)/E$ where E is Young's modulus and $\mu$ is the Poisson's ratio of the resistive material.

For appropriate materials Young's modulus E is about $1.3 \times 10^5$ N/mm$^2$ and the Poisson's ratio $\mu$ is about $\frac{1}{3}$. Therefore, the result for the pressure coefficient of the electrical resistance is about $+1 \times 10^{-6}$/bar. Materials having this value of a pressure coefficient are disclosed in the VDI Berichte, No. 93, VDI-Verlag 1966, pages 21 to 24.

In order to ensure that all patterns of the overlying resistive layers completely follow the strains of the carrier body according to an embodiment of the invention it is proposed to apply the thin film arrangement by the method of cathode sputtering onto the carrier body. Hereby, very thin layers may be applied, which adhere very well and whose deformation resistance against the strains forced by the carrier body is neglectibly small.

According to a further embodiment of the invention it is proposed that the insulating layers on the carrier body and between the overlying patterns of the resistive layers comprise an inorganic material such as $Al_2O_3$ or $SiO_2$ In a further development of the principle of the invention a detrimental influence of the sum term of the two strains of the carrier body on the change in resistance of the measuring element may be eliminated by using for the resistive layers a copper manganese alloy having 0.3 to 1 atom per cent maganese or a silver maganese alloy having 2 to 3 atom per cent maganese or a gold chrome alloy having two atom per cent chrome.

Due to a further improvement of the invention a detrimental influence of the difference term of the two strains of the carrier body on the change in resistance of the measuring element has been eliminated by arranging tangents of the centre lines of the filaments at an angle of preferably 90° at the crossing points of the filament of two patterns.

Two patterns of the overlying resistive layers in a series connection form the resistor in a branch of a bridge circuit.

For compensating detrimental influences in a still further embodiment of the invention it is proposed to provide a piezo-resistive compensation element corresponding to the piezo-resistive measuring element as a resistor in in a bridge circuit containing the measuring element and the compensation element. In this case, the compensation element is arranged on the surface of the same carrier body as the measuring element which surface, however, is free from the normal stress field.

In order to eliminate temperature influences on the measuring signal, according to a further improvement of the subject of the application, it is proposed that the patterns subjected to the normal stress field represent the measuring element resistance in a branch of a full bridge circuit and the pattern which are free from the normal stress field represent compensation element resistance in the adjacent branch of the full bridge circuit. When choosing the resistance for the measuring element equal to that of the compensation element temperature dependent changes in resistance in the two branches of the full bridge circuit are equal and compensate each other in their influence on the measuring signal.

In order to double the magnitude of the measuring signal as compared to the above-mentioned bridge circuit with the same magnitude to the normal stress whilst again eliminating temperature influences onto the measuring signal, according to a further embodiment of the invention, it is proposed that of the number of patterns which are subjected to the normal stress fields one half forms a measuring element resistance in one branch of a full bridge circuit and the other half forms a measuring element resistance in the diametrically opposite branch and that of the number of patterns which are free from the normal stress field the one half forms a compensation element resistance in a further branch of the full bridge circuit and the other half in the diametrically opposite branch. If for the measuring element and the compensation element there are provided, for instance, two overlying patterns having equal resistance each the projections of the patterns in the direction of the surface normal forms a crossing pattern, one pattern each in a branch and the overlying pattern in the diametrically opposite branch are connected to the full bridge. The electrical connection of the pattern, both for the measuring element and for the compensation element in diametrically opposite branches of the full bridge eliminates any effect of the difference term of the two orthogonal strains onto the measuring signal since thereby equal changes in resistance having opposite sign compensate their influence on the measuring signal.

In order to produce simultaneously the two resistive layers in one coating process in order to lower the manufacturing costs, according to a further embodiment of the invention, it is proposed that one of the insulating layers between the resistive layers is the electric insulating carrier body itself.

According to a further embodiment of the subject of the invention it is proposed that the insulating carrier body is completely of insulating material for instance oxid ceramic or of a metal foil or plate coated on the two sides with insulating layers.

In order to smooth any unevenness of the carrier body and the transmission body and to enable the transmission of the normal stress field into the measuring element over the whole surface it is proposed, according to a further improvement of the invention, that between the uppermost pattern of the measuring element and the transmission body there is provided an insulating layer comprising of a layer of an inorganic material and/or an intermediate layer of an organic material. The uppermost pattern of the measuring element may be coated at first with a relative hard insulating layer of $Al_2O_3$ which is then coated with a relative soft synthetic layer.

According to a further embodiment of the invention it is proposed that the insulating layer joins firmly the uppermost pattern of the measuring element with the transmission body. In this case, for instance, a thin adhesive film consisting of epoxy resin may be used.

For measuring pressures in various media, of stresses in solids, for instance concrete, and of Hertzian stress distributions between solids, according to a further improvement of the invention, it is proposed to use the insulating layer as the transmission body. Hereby, the mass of the transmission body becomes very small and the eigen frequency of the transducer very high such that for instance pressure responses having extremely short rise times may be captured very well.

According to a still further embodiment of the invention it is proposed that the transmission body is a medium or a body for introducing the force, the pressure or the mechanical stress into the sensor. Such sensors have a particular flat design and may for instance be used as knocking sensors in the cylinder head sealing of combustion machines for capturing undesired pressure peaks of the combustion process. The sealing mass of the cylinder head sealing represents in this case the transmission body.

In a further embodiment of the invention it is proposed that the areas of the carrier body covered by the measuring element and the compensation element each are essentially equal. Hereby a capacitive symmetry is achieved with the measuring element and the compensation element which is of advantage when the bridge circuit is supplied with a carrier frequency alternating voltage.

The advantages achieved by the invention are in particular that the force sensors may be used in many ways wherever only a very small insertion height for the force sensor is available and very small limits of measurement errors and a very good longterm stability are required.

A particular advantage apparently is that instead of costly almost creep-free materials as for instance highly alloyed temper-hardened steel also cheap materials for the carrier body and the transmission body may be used since time independent and time dependent lateral strains of the bodies do not affect the measuring signal. Also, temperature-related changes of the dimensions of the body both due to a thermal extension and due to the changes of the Young's moduli of the materials do not result in any change in resistance in the measuring element and the compensation element detrimental for the measuring signal. There is a free choice in the design and material selection for the introduction body for introducing the quantity to be measured into the force sensor. Furthermore, any desired media may act onto the force sensor even such having a large interior friction since different lateral strains at the introducing surfaces of the sensor do not affect the measuring signal, too.

The limits of measurement errors of the force sensor are so small that precision measurements are possible which in particular are required in the field of the weighing.

The invention is equally applicable for force, torque, acceleration and stress transducers: it will be explained in detail by a reference to six figures which illustrate various embodiments.

In the figures

Figure 2:
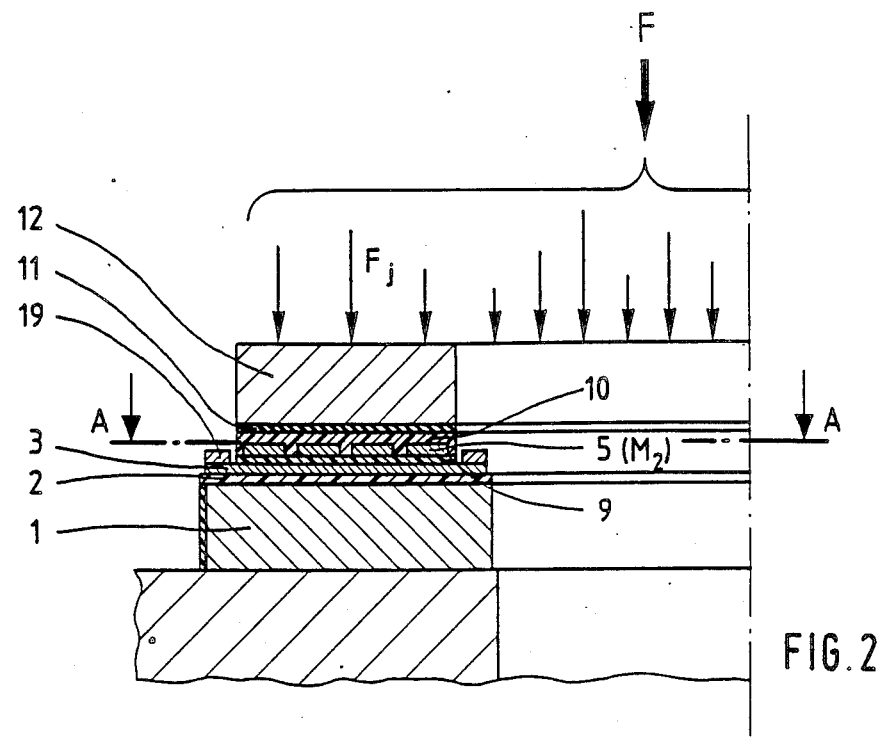
Figure 3:
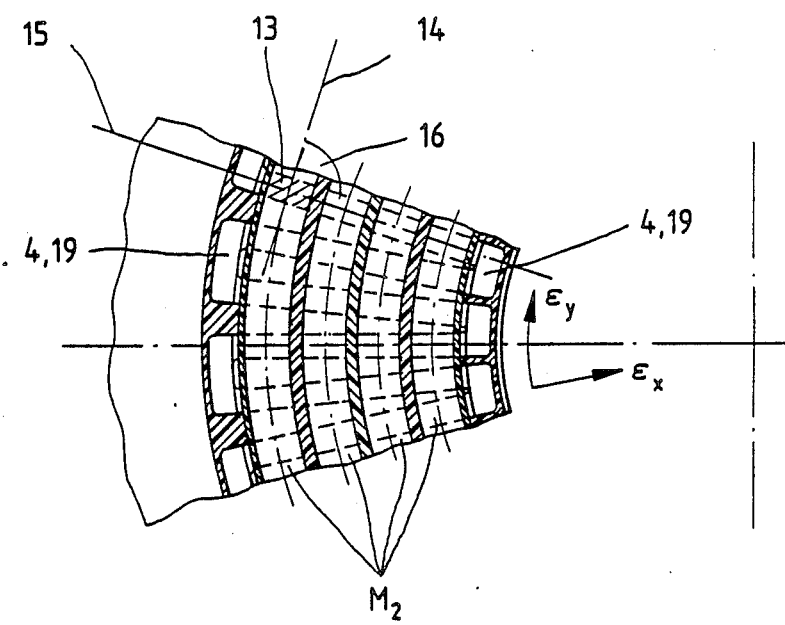
Figure 4:
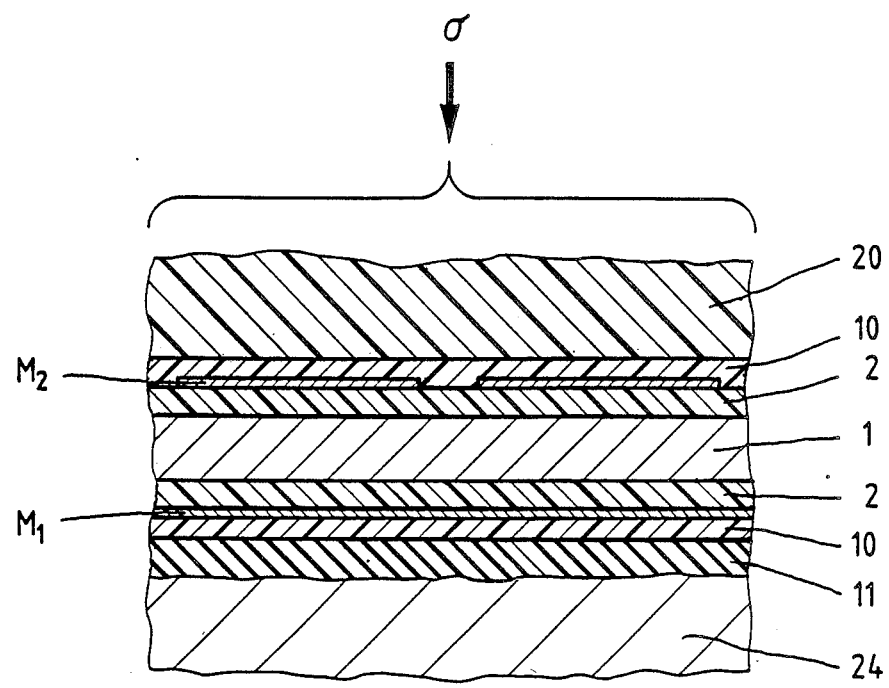
Figure 4A:
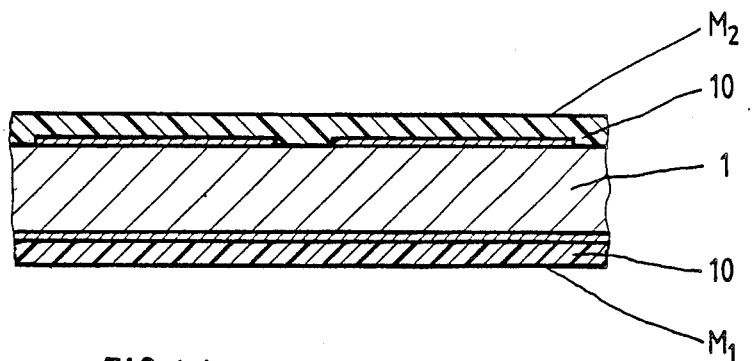
Figure 5:
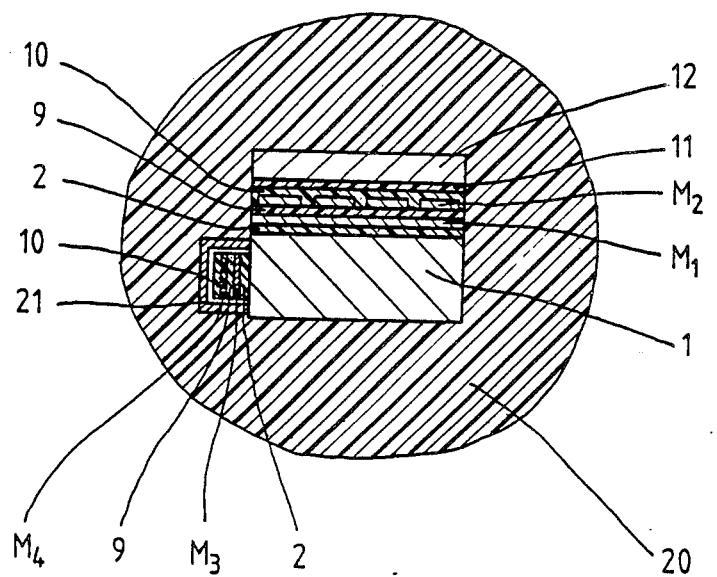
Figure 6:
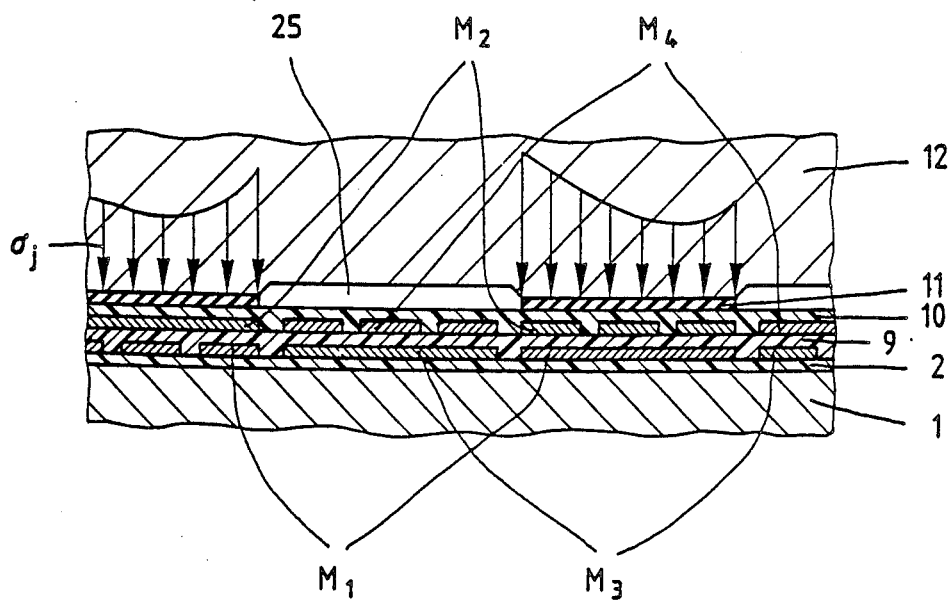

FIG. 1 is a perspective view partially exploded and broken away of a force sensor including patterns firmly attached to a carrier body, the filaments of the pattern being shown very narrow and the insulating layers very thick for purposes of illustration, FIGS. 1A$_1$ and 1A$_2$ is a detailled section of the overlying patterns of piezo-resistive measuring element according to FIG. 1 and including a magnified illustration of a cross point of two filaments the insulating layers are omitted from the magnified illustration for purpose of clearity, FIG. 1b shows a circuit diagram of one half of a full bridge with the circuit connected patterns, FIG. 1c is a circuit diagram of a total bridge with circuit connected patterns of the measuring element and the compensation element, FIG. 2 is an annular force transducer in longitudinal section, FIG. 3 is a section along the line A—A through FIG. 2, FIG. 4 is a detail cut of a stress sensor, FIG. 4a is a modification of FIG. 4, FIG. 5 is a pressure or stress sensor completely embeded in the medium in which it shall measure and FIG. 6 is a detail cut from a universal force sensor for measuring force, torque, acceleration, pressure and mechanical stress.

The force sensor illustrated in FIG. 1 comprises a carrier body 1 having a thin film arrangement 2, M$_1$, M$_3$, 9, M$_2$, M$_3$, 9, M$_2$, M$_4$, 10, 11 and a transmission body 12. The carrier body 1 is coated with an insulating layer 2 provided with the patterns M$_1$ and M$_2$ forming the piezo-resistive measuring element and the patterns M$_3$ and M$_4$ forming the compensation element and the insulating layer 9 arranged between the patterns M$_1$ and M$_2$ and M$_3$ and M$_4$, respectively. Pattern M$_2$ is coated with an insulating layer which consists of a layer 10 of an inorganic material and an intermediate layer 11 of an organic material. The layer 11 joins firmly the layer 10 with the transmission body 12 having applied thereto the force F in a random force distribution F$_j$. It is F=F$_1$+ ... +F$_j$+ ... F$_n$. The transmission body 12 converts the force distribution F$_1$ into a normal stress field $\sigma_j$ which is transmitted to the measuring elements by means of the layers 10 and 11.

The detailed section illustrated in FIGS. 1A$_1$ and 1A$_2$ and cut out of the measuring element shows filaments 3 and 5 of the patterns M$_1$ and M$_2$ which form a crossing pattern in the direction of the surface normal N$_1$. In the magnified illustration in each filament rectangular plane elements 13 may be recognised which are caused by the projections of the filaments 3 and 5 onto each other in the direction of the surface normal N$_1$. The normal stress $\sigma$ transmitted in the direction of the surface normal N$_1$, from the transmission body 12 and the layers 10 and 11 to the cross poihts is equal on the two plane elements 13 since the layers are very thin. The stress $\sigma$ acts perpendicular pendiclar to the direction of the current i. The plane elements 13 completely exhibit the local strains $\epsilon_x$ and $\epsilon_y$ of the carrier body 1. If the plane elements of the filament 3 and 5 are series connected for instance in a branch of a bridge circuit their changes in resistance dR$_3$ and dR$_5$ caused by the strain difference ($\epsilon_x-\epsilon_y$) may be completely compensated. This requires that their restistances R$_3$ and R$_5$ are equal. This will be achieved by the fact that the length $p$ of the area element 13 in the filament 3 is determined by choosing the width b of the filament 5 even in the case that the square resistance of the patterns M$_1$ and M$_2$ are different. R$_3$=R$_5$ leads to dR$_3$=−dR$_5$, since dR$_3$=($\epsilon_x-\epsilon_y$)·R$_3$ and and dR$_5$=($\epsilon_y-\epsilon_x$)·R$_5$. From the circuit diagram of FIG. 1b it may be gathered that the patterns M$_1$ and M$_2$ are series connected in one branch of the bridge circuit and form the measuring element resistance 17. In pattern M$_1$ there is alot of elements of the filament 3 which all may be subject to a different local normal stress $\sigma$ and a different local strain pair $\epsilon_x$, $\epsilon_y$. Since at the cross point each filament element in the pattern M$_1$ corresponds to a filament element locally associated in the direction of the surface normal N$_1$ of the filament 5 in pattern M$_2$ also in this case a complete compensation of the resistance changes may be achieved caused by the difference $\epsilon_x-\epsilon_y$ of the local strain pairs in the filaments 3 and 5. The similar compensation is possible for the patterns M$_3$ and M$_4$ of the compensation element arranged in the adjacent bridge branch and which are subject to locally different strain pairs $\epsilon_1$, $\epsilon_2$. The patterns M$_3$ and M$_4$ are series connected and form the compensation element restistance 18. The resistors 22 are external supplemental resistors of the bridge circuit.

The circuit diagram of FIG. 1c shows that the patterns M$_1$ and M$_2$, and M$_3$ and M$_4$, respectively, are diametrically connected in a full bridge. Also in this case a complete compensation of the resistance changes caused by the local differences ($\epsilon_x-\epsilon_y$) and ($\epsilon_1-\epsilon_2$) respectively, is possible. Since these changes in resistance in the pattern M$_1$ and the pattern M$_2$ are equal but of different sign they do not cause any alteration at the measuring instrument 23. The change in the current in the bridge branches caused by the resistance changes may be neglected since dR is very much smaller than R. The same consideration is applicable for the patterns $M_3$ and $M_4$. Since the patterns $M_1$ and $M_2$ are diametrically opposite connected but are loaded through the normal stress in the same direction a measuring signal of twice the magnitude compared to the signal of the circuit of FIG. 1b may be achieved.

The embodiment according to FIG. 2 illustrates an annular force sensor to the transmission body 12 of which the force F to be measured is applied with a radially and peripherally random force distribution $F_j$.

FIG. 3 shows the layout of the circular filaments 5 in peripheral direction and the layout of the straight filaments 3 in radial direction. At the cross points of the filaments 3 and 5 the tangent 14 of the centre line of the filament crosses the tangent 15 of the centre line of the filament 3 at a right angle 16. In this case the centre line of filament 3 coincides with the tangent 15. By projection in the two filaments the hatched area element 13 is created onto which acts the local normal stress $\sigma$ and the local strain pair $\epsilon_x$, $\epsilon_y$. The joints 4 of the filaments 3 arranged exterior of the normal stress region are provided with a very low-resistant additional layer 19, for instance gold. Hereby the square resistance of the junction is essentially reduced as compared with that of the filament. By this measure sensitivity losses at the measuring element due to the joints are essentially avoided.

FIG. 4 shows as an embodiment a stress sensor the carrier body 1 of which is in the form of a metal foil coated on both sides with the insulating layer 2. In this case, the carrier body has the function of the insulating layer 9 between the patterns $M_1$ and $M_2$. On the patterns $M_1$ and $M_2$ there is attached the insulating layer 10 consisting of an inorganic material. The sensor with its intermediate layer 11 is arranged on the element 24, for instance, a flange of a combustion machine housing. The layer 11 consists of an organic material smoothing unevenness and roughness of the element surface. The stress $\sigma$ is transmitted to the sensor through the medium 20, for instance, the sealing material of the cylinder head sealing of a combustion machine. In this case, the medium 20 has the function of the intermediate layer 11 and the transmission body 12. The patterns $M_3$ and $M_4$ of the compensation element (not shown) are free from the medium 20.

In FIG. 4a a modification of the embodiment according to FIG. 4 is illustrated. In this case the carrier body 1 completely consists of insulating material.

The embodiment according to FIG. 5 represents a pressure or stress sensor which is completely surrounded by the medium 20 in which it is to measure the pressure of the stress. In this case the medium 20 may be, for instance, a hydraulic liquid, rubber, concrete or soil. The compensation element is arranged on a surface of the carrier body which surface is perpendicular to that surface on which the measuring element is arranged. That surface of the carrier body on which the patterns ($M_3$ and $M_4$) for the compensation element are attached is kept free from the normal stress field by the pressure-tight protection cap 21. The protection cap may in this case be connected with the carrier body, for instance, by soldering or welding in a pressure-tight manner and may include pressure-tight glass passages for the electric connections of the patterns $M_3$ and $M_4$.

FIG. 6 shows an embodiment of an universal force sensor for force, torque, acceleration, pressure or mechanical stress where the surface of the substrate 1 covered by the measuring element and the compensation element each are in the same plane. That surface of the transmission body 12 adjacent to the measuring element is provided with a wide planar recess 25 which is opposite to an associated compensation element. Hereby, the compensation element is kept free from the normal stress field $\sigma_j$. The surface areas of the carrier body covered by the patterns $M_1$, $M_2$ of the measuring element and the patterns $M_3$, $M_4$ of the compensation element each are essentially equal in size. This is of advantage when supplying an alternating voltage to the bridge circuit since thereby the capacitive influence at the measuring element and compensation element are equal and compensate each other in their effect on the measuring signal.

I claim:

1. A force sensor for electric measuring of forces, torques, acceleration, pressures and/or mechanical stresses applied to said force sensor in the form of a distributed mechanical stress field comprising:
    (a) an electrically insulating carrier body;
    (b) a piezo-resistive transducer comprising a first pattern of filaments firmly attached to said carrier body and at least one further pattern of filaments upon said first pattern, said patterns being separated by insulating layers, said filaments consisting of resistive material, said filaments of said first pattern having a direction transverse to that of said filaments of said further pattern;
    (c) a force transmission means for applying said distributed mechanical stress field in normal direction onto said piezo-resistive transducer;
    (d) plane elements formed by the projection of two adjacent of the said patterns in the direction of the lines of force of said stress field, said elements being of equal area and completely subjected to any strain of the carrier body caused by said distributed mechanical stress field, said strain having first and second strain components in the direction of said filaments of said first and said further patterns respectively; and
    (e) a bridge circuit arrangement having branches consisting of said first and said further patterns, an electric current flowing through said first pattern in said direction of said first strain component and through said further pattern in said direction of said second strain component.

2. The force sensor of claim 1 wherein the resistive material is selected with a material constant c such that a change in resistance of said piezo-resistive transducer due to the application of said mechanical normal stress field remains essentially unaffected by mechanical strains of said transducer caused by said strain components of said carrier body.

3. The force sensor of claim 2 wherein said material constant c is determined by $c = -\mu/(1-2\mu)$ where $\mu$ is the Poisson's ratio of the resistive material, the result being used for determining the pressure coefficient $\alpha_p$ of the electric resistance of said resistive material.

4. The force sensor of claim 3 wherein $\alpha p = (1+\mu)/E$ where E is the Young's modulus of the resistive material.

5. The force sensor of claim 1 wherein a piezo-resistive compensation element corresponding to said piezo-resistive transducer is electrically connected in a first branch of a bridge circuit, a second branch thereof comprising said piezo-resistive transducer, said compensation element being arranged on a surface of said carrier body free from the influence of said normal stress field.

6. The force sensor of claim 1 wherein said piezo-resistive transducer is a thin film arranged firmly attached to said carrier body by means of cathode sputtering.

7. The force sensor of claim 1 wherein said plane elements of two adjacent patterns of filaments are of quadrangular form and have—in respect of said current direction—a ratio of length to width such that the product of ohmic area resistance of said filaments according to this ratio is the same in said two patterns.

8. The force sensor of claim 1 wherein at crossing points of said filaments of two adjacent of said patterns tangents of centre lines of said filaments form a right angle.

9. The force sensor of claim 1 wherein said filaments of two adjacent of said patterns are electrically series connected in one branch of said bridge circuit arrangement.

10. The force sensor of claim 5 wherein said piezo-resistive compensation element comprises a third pattern and at least one further pattern of filaments lying upon each other and said filaments of said patterns of said piezo-resistive transducer and said compensation element are arranged individually in different branches of a full bridge connection of said bridge circuit arrangement.

11. The force sensor of claim 1 wherein said filaments have ends provided with connecting means arranged on said carrier body such that they are free from said normal stress field.

12. The force sensor of claim 1 wherein one of said insulating layers provided between said patterns is formed by said carrier body.

13. The force sensor of claim 1 wherein between said force transtransmission body and the upper surface of patterns an intermediate layer of organic material is provided firmly attaching said upper surface of said pattern to said force transmission body.

14. The force sensor of claim 1 wherein said carrier body is a constructional element of a technical means.

15. The force sensor of claim 1 wherein said force transmission means is a solid body.

16. The force sensor of claim 1 wherein said force transmission means is a deformable medium.

17. A force sensor for electric measuring of forces, torques, accelerations, pressures and/or mechanical stresses acting in the form of a distributed mechanical stress field comprising:
(a) an electrically insulating carrier body,
(b) a piezo-resistive transducer comprising at least one two-dimensional pattern of filaments consisting of resistive material and firmly attached to said carrier body,
(c) a force transmission means for applying said distributed mechanical stress field normal to said piezo-resistive transducer;
wherein a material constant c of said resistive material is selected such that any change in resistance of the piezo-resistive transducer due to said stress field to be measured remains essentially uninfluenced by mechanical strain acting on said transducer and caused by mechanical strain caused in said carrier body upon application of said distributed mechanical stress field.

18. The force sensor of claim 17 wherein said material constant c is determined on the basis of the Poisson's ratio $\mu$ of said resistive material.

19. The force sensor of claim 18, wherein $c = -\mu/(1-2\mu)$.

20. The force sensor of claim 18, wherein a pressure coefficient $\alpha_p$ of the electric resistance of said resistive material is selected as $\alpha_p = (1+\mu)/E$ where E is the Young's modulus of the resistive material.

21. A force sensor for electrical measuring of forces, torques, acceleration, pressures and/or mechanical stresses applied to said force sensor in the form of a distributed mechanical stress field, comprising:
(a) an electrically insulating carrier body;
(b) a piezo-resistive transducer means comprising at least one pattern of filaments consisting of resistive material and firmly attached to said carrier body,
(c) a force transmission means for applying said distributed mechanical stress field in normal direction to said piezo-resistive transducer,
(d) a piezo-resistive compensation element having a design corresponding to said piezo-resistive transducer and being attached to a surface of said insulating carrier body, said compensation element being free from said distributed mechanical stress field, said piezo-resistive compensation element being electrically connected in branches of a bridge circuit arrangement; wherein a material constant c of said resistive material is selected such that any change in resistance of the piezo-resistive transducer due to said stress field to be measured remains essentially uninfluenced by mechanical strain acting on said transducer and caused by mechanical strain caused in said carried body upon application of said distributed mechanical stress field.

22. The force sensor of claim 21 wherein an area of said force transmission means adjacent to said transducer means is provided with at least one flat recess opposing said associated compensation element.

* * * * *